United States Patent [19]

Doi

[11] Patent Number: 5,432,881
[45] Date of Patent: Jul. 11, 1995

[54] OPTICAL WAVEGUIDE WITH OVERLAPPING DIFFUSION REGIONS CONTAINING DIFFERENT DIFFUSION MATERIALS

[75] Inventor: Masaaki Doi, Yokohama, Japan

[73] Assignee: Nikon Corporation, Tokyo, Japan

[21] Appl. No.: 192,695

[22] Filed: Feb. 7, 1994

[30] Foreign Application Priority Data

Feb. 9, 1993 [JP]   Japan ................... 5-021486

[51] Int. Cl.⁶ ............................... G02B 6/10
[52] U.S. Cl. ........................ 385/132; 385/14; 385/129
[58] Field of Search ............. 385/132, 14, 39, 49, 385/129, 130, 131; 250/234; 65/3.11, 410, 501

[56] References Cited

U.S. PATENT DOCUMENTS

| | | | |
|---|---|---|---|
| 3,785,717 | 1/1974 | Croset et al. | 385/132 |
| 4,775,208 | 10/1988 | Robinson et al. | 385/132 X |
| 4,783,136 | 11/1988 | Elman et al. | 385/130 |
| 5,280,189 | 1/1994 | Schüppert et al. | 385/14 X |

FOREIGN PATENT DOCUMENTS

| | | |
|---|---|---|
| 62-103604 | 5/1987 | Japan . |
| 3-278009 | 12/1991 | Japan . |
| 4-155228 | 5/1992 | Japan . |
| 4-208913 | 7/1992 | Japan . |
| 4-209339 | 7/1992 | Japan . |
| 4-252444 | 9/1992 | Japan . |
| 4-296810 | 10/1992 | Japan . |

OTHER PUBLICATIONS

Ooki and Iwasaki, *Optics Communications 85*, "A Novel Type of Laser Scanning Microscope: Theoretical Considerations", 1991, pp. 177–182, Jan. 1991.

Bulmer, *Electronics Letters*, Oct. 1984, vol. 20, No. 22, pp. 902–904.

*Proceedings 7th Meeting Society for Laser Microscopy*, May 10, 1991.

Extended Abstracts, (The 38th Spring Meeting), Mar. 28, 1991.

OITDA, "New Trends on Scanning Optical Microscopy", Jan. 8–10, 1992.

Tanaka, N. et al, "Mg/Ti Bilaterally Diffused LiNbO₃ Optical Switch," *Applied Optics*, vol. 29, No. 34, Dec. 1990, pp. 5090–5095.

Komatsu, K. et al, "Low-Loss Broad-Band LiNbO₃ Guided-Wave Phase Modulators Using Titanium/-Magnesium Double Diffusion Method," *Journal of Lightwave Technology*, vol. 5, No. 9, Sep. 1987, pp. 1239–1245.

Patent Abstracts of Japan, vol. 12, No. 334 (P-756), 27 Apr. 1988 (JP-A-63 096 604).

Patent Abstracts of Japan, vol. 16, No. 276 (P-1374), 9 Mar. 1992 (JP-A-04 073 605).

Patent Abstracts of Japan, vol. 17, No. 107 (P-1496), 21 Feb. 1992 (JP-A-04 296 810).

Patent Abstracts of Japan, vol. 16, No. 3 (P-1294), 4 Oct. 1991 (JP-A-03 225 301).

*Primary Examiner*—Rodney B. Bovernick
*Assistant Examiner*—Phan T. H. Palmer
*Attorney, Agent, or Firm*—Shapiro and Shapiro

[57] ABSTRACT

A first region diffused with a first diffusion material containing at least one element and a second region diffused with a second diffusion material containing at least another element are formed in a substrate. At least part of the second region overlaps part of the first region. A region of the first region which does not overlap the second region has a refractive index higher than that of a region where the first region overlaps the second region and that of the substrate. The region of the first region which does not overlap the second region serves as a core for propagating a light beam. The region where the first region overlaps the second region and the region of the substrate not diffused with the first and second diffusion materials serve as a clad.

12 Claims, 13 Drawing Sheets

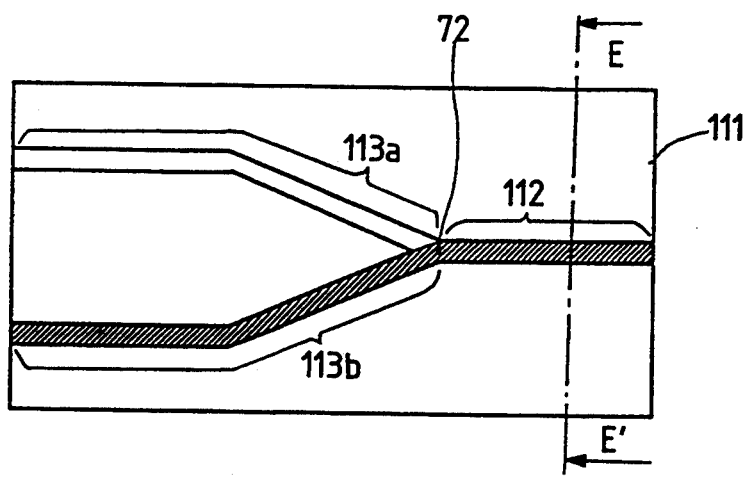
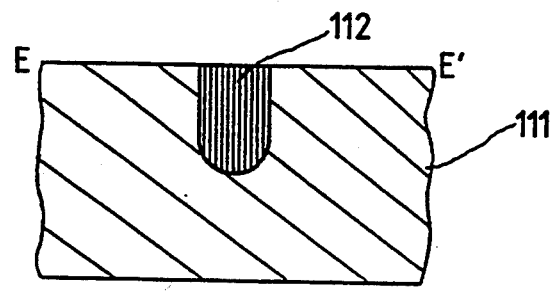
FIG. 11A
FIG. 11B
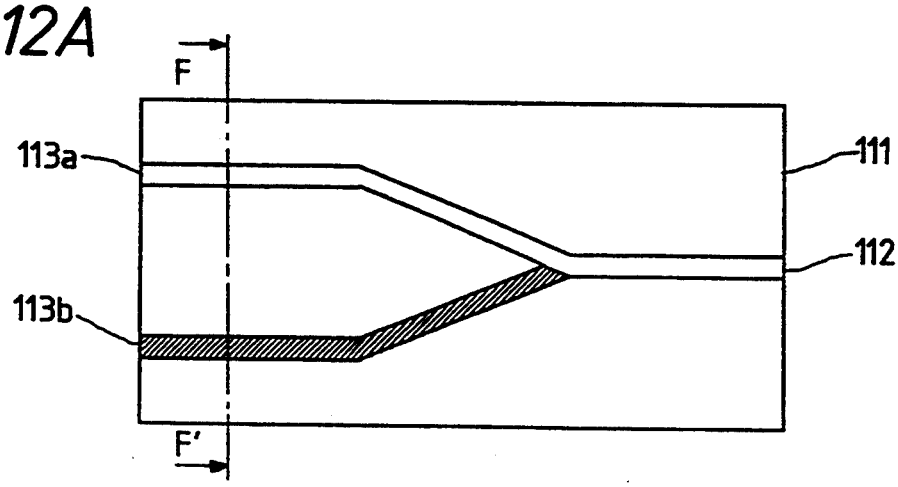
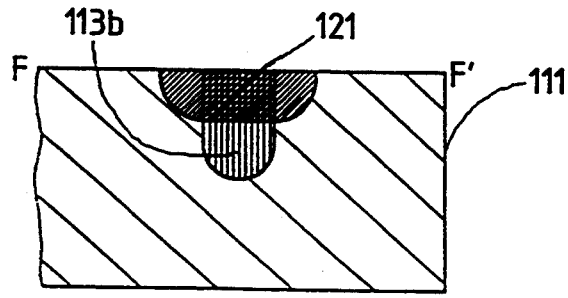
FIG. 12A
FIG. 12B

OPTICAL WAVEGUIDE WITH OVERLAPPING DIFFUSION REGIONS CONTAINING DIFFERENT DIFFUSION MATERIALS

BACKGROUND OF THE INVENTION

1. Field of the Invention

The present invention relates to an optical waveguide.

2. Related Background Art

In recent years, optical waveguides have received a great deal of attention in various application fields. This is because use of an optical waveguide can provide a smaller and lighter optical system and eliminate the necessity of adjustment of the optical axis.

Optical waveguides are classified into a single mode waveguide, a double mode waveguide, and a multimode waveguide in accordance with a difference between the refractive index of a core and that of a clad, the width and depth of the waveguide, and a refractive index distribution. In a single mode waveguide, only a 0th-order mode is excited. In a double mode waveguide, two modes, i.e., 0th- and 1st-order modes are excited. In a multimode waveguide, three or more modes (0th-order mode, 1st-order mode, 2nd-order mode and more) are excited.

In an optical waveguide having a waveguide structure both in a direction of width and in a direction of depth, these modes are individually excited in the direction of width and in the direction of depth in the order of 0th-, 1st-, 2nd-order modes, etc.

Conventionally, in a known waveguide, a region having a high refractive index is formed by diffusing an element in part of a substrate, the region having a high refractive index is used as a core, and the substrate is used as a clad.

However, in the optical waveguide having a core formed by diffusing an element in part of the substrate, the width and depth of the core are determined by the diffusion rate of the element. For this reason, it is difficult to manufacture a waveguide having arbitrary maximum mode number in both the direction of width and the direction of depth.

For example, when diffusion progresses at the same rate in the direction of width and in the direction of depth, a waveguide having a narrow and deep core cannot be manufactured. It is thus hard to manufacture a waveguide having two modes in the direction of depth and one mode in the direction of width.

In applications of optical waveguides to various apparatuses, use of a double mode waveguide capable of utilizing the interference of the 0th- and 1st-order modes allows wider applications. However, because the maximum mode number in the width and depth directions of the waveguide can hardly be controlled, the waveguides cannot be easily applied to apparatuses.

SUMMARY OF THE INVENTION

The present invention has been made in consideration of the above situation, and has as its object to provide an optical waveguide capable of easily setting maximum mode number in the directions of width and depth to arbitrary values.

In order to achieve the above object, according to the present invention, there is provided an optical waveguide having a substrate, a first region formed in part of the substrate by diffusing a first diffusion material containing at least one element, and a second region formed in part of the substrate by diffusing a second diffusion material containing at least one element different from that of the first diffusion material, wherein the second region is arranged such that at least part thereof overlaps part of the first region, a region of the first region which does not overlap the second region has a refractive index higher than that of a region where the first region overlaps second region and that of the substrate, and the region of the first region which does not overlap the second region serves as a core for propagating light, and the region where the first region overlaps the second region and a region of the substrate not diffused with the first and second diffusion materials serve as a clad.

The first and second regions can be arranged such that a normalized frequency V determined by the width of the core and the refractive indices of the core and clad satisfies the following condition $$V < V_i < V'$$

where $V_i$: the cut off normalized frequency of the ith-order mode, i: a predetermined specific natural number, $V'$: the normalized frequency of a waveguide in which, in the substrate having only the first region and no second region, the first region serves as a core and a region of the substrate not diffused with the first diffusion material serves as a clad.

The optical waveguide of the present invention is manufactured by a combination of a thermal diffusion method for increasing the refractive index by thermally diffusing a predetermined element in the substrate and a thermal diffusion method for decreasing the refractive index by thermally diffusing a predetermined element in the substrate. More specifically, a first diffusion material containing an element for increasing the refractive index is diffused in part of the substrate to form a first region. A second diffusion material containing an element for decreasing the refractive index is diffused in part of the substrate to form a second region. At this time, the second region is arranged such that at least part thereof overlaps the first region.

Since the element for increasing the refractive index is diffused in the first region, and the element for decreasing the refractive index is diffused in the second region, the region of the first region which does not overlap the second region has a refractive index higher than that of the region where the first region overlaps the second region and that of the substrate. Therefore, the region of the first region which does not overlap the second region is used as a core for propagating light, and the region where the first region overlaps the second region and the region of the substrate not diffused with the elements of the first and second diffusion materials are used as a clad, thereby constituting a waveguide structure.

When the second region overlaps the first region in the direction of width, a core narrower than the first region can be formed. When the second region is arranged to overlap the first region in the direction of depth, a core shallower than the first region can be formed. For this reason, a core having an arbitrary shape can be formed regardless of the diffusion coefficient of the element in each direction of the first region.

Therefore, even when the diffusion coefficient in a direction parallel to the substrate surface is sufficiently larger than that in the direction of depth, a waveguide whose maximum mode number in the direction of depth is larger than that in the direction of width can be provided.

BRIEF DESCRIPTION OF THE DRAWINGS

FIGS. 1A and 1B show the arrangement of an optical waveguide according to the first embodiment of the present invention, wherein FIG. 1A is a perspective view and FIG. 1B is a sectional view;

FIGS. 7A to 7C show the arrangement of an optical waveguide according to the fourth embodiment of the present invention, wherein FIG. 7A is a plan view, FIG. 7B is a sectional view for explaining the arrangement along the line A—A', and FIG. 7C is a sectional view for explaining the arrangement along the line B—B';

FIGS. 8A to 8C are views for explaining a method of manufacturing the optical waveguide according to the fourth embodiment of the present invention, wherein FIG. 8A is an explanatory view, FIG. 8B is a sectional view taken along the line C—C', and FIG. 8C is a sectional view taken along the line C—C';

FIGS. 9A and 9B are views for explaining the method of manufacturing the optical waveguide according to the fourth embodiment of the present invention, wherein FIG. 9A is an explanatory view and FIG. 9B is a sectional view taken along the line D—D';

FIGS. 10A and 10B are views for explaining the method of manufacturing the optical waveguide according to the fourth embodiment of the present invention, wherein FIG. 10A is an explanatory view and FIG. 10B is a sectional view taken along the line L—L';

FIGS. 11A and 11B are views for explaining a method of manufacturing an optical waveguide according to the fifth embodiment of the present invention, wherein FIG. 11A is an explanatory view and FIG. 11B is a sectional view taken along the line E—E';

FIGS. 12A and 12B are views for explaining the method of manufacturing the optical waveguide according to the fifth embodiment of the present invention, wherein FIG. 12A is an explanatory view and FIG. 12B is a sectional view taken along the line F—F;

FIGS. 13A and 13B are views for explaining the method of manufacturing the optical waveguide according to the fifth embodiment of the present invention, wherein FIG. 13A is an explanatory view and FIG. 13B is a sectional view taken along the line G—G';

FIGS. 14A to 14D are views for explaining a method of manufacturing an optical waveguide according to the sixth embodiment of the present invention, wherein FIG. 14A is an explanatory view, FIG. 14B is a sectional view taken along the line I—I', FIG. 14C is an explanatory view, and FIG. 14D is a sectional view taken along the line H—H';

FIGS. 17A to 17D show the arrangement of a tracking error detector for an optical head according to the eighth embodiment of the present invention, wherein FIG. 17A is a schematic view, FIGS. 17B and 17C are sectional views of a waveguide, and FIG. 17D is a plan view of the optical disk.

DETAILED DESCRIPTION OF THE PREFERRED EMBODIMENTS

An embodiment of the present invention will be described with reference to the accompanying drawings.

First Embodiment

Figure 1A:
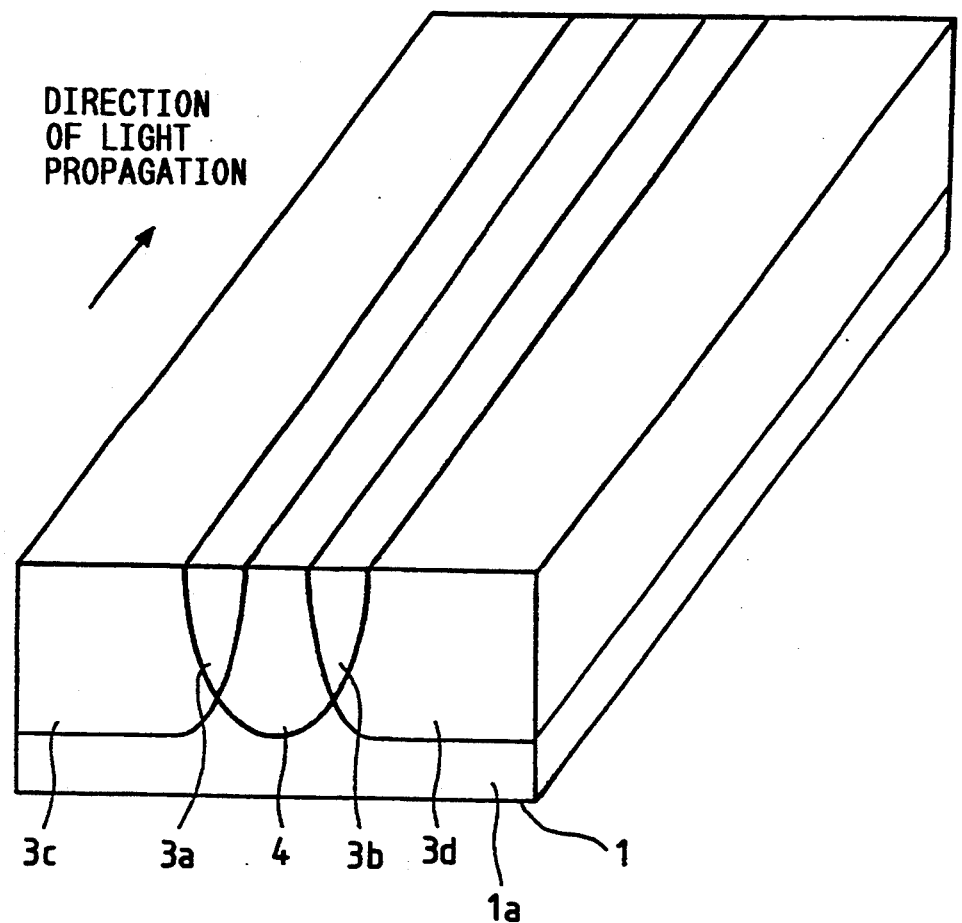
Figure 1B:
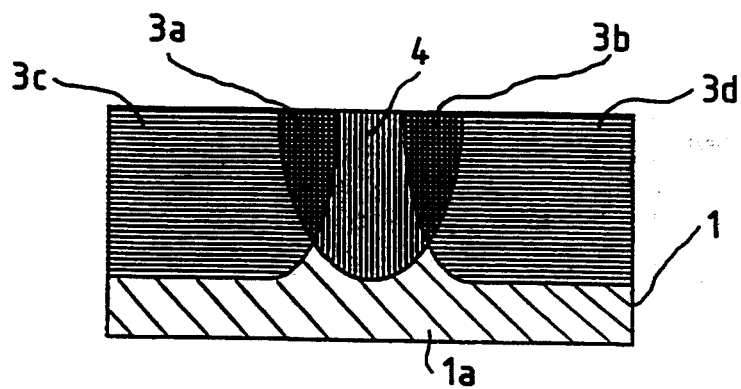

The optical waveguide according to the first embodiment of the present invention is shown in FIGS. 1A and 1B.

Figure 6:
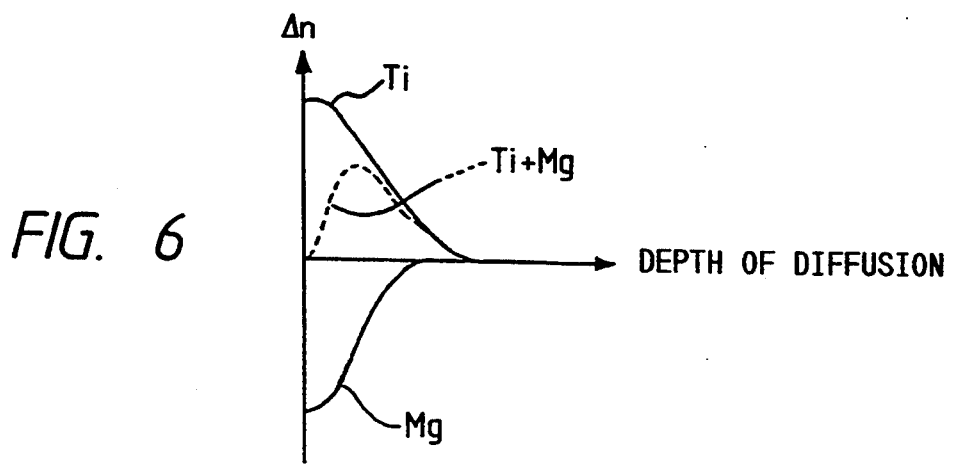
FIG. 6 is a graph showing the refractive indices of Ti- and MgO-diffused lithium niobates.

As shown in FIGS. 1A and 1B, the optical waveguide of this embodiment is constituted by regions 4, 3a, and 3b formed by diffusing Ti (titanium) in a substrate 1 made of single-crystal lithium niobate, and regions 3a, 3b, 3c, and 3d formed by diffusing Mg (magnesium) in the substrate 1. Both Ti and Mg are diffused in the regions 3a and 3b. As shown in FIG. 6, it is known that the refractive index of the Ti-diffused lithium niobate is higher than that of the nondiffused lithium niobate, and the refractive index of the Mg-diffused lithium niobate is lower than that of the nondiffused lithium niobate. As shown in FIG. 6, it is also known that a change An in refractive index of the Ti- and Mg-diffused lithium niobate is a sum of a change in refractive index of the Ti-diffused lithium niobate and a change in refractive index of the Mg-diffused lithium niobate. Therefore, the Ti-diffused region 4 has a refractive index higher than that of the Ti- and Mg-diffused regions 3a and 3b and that of a nondiffused region 1a.

In the optical waveguide of this embodiment, the region 4 serves as a core for propagating light, and the regions 3a and 3b, the nondiffused region 1a, and the air layer in contact with the region 4 serve as a clad. In the optical waveguide of this embodiment, a single mode waveguide is formed in a direction parallel to the surface of the substrate 1, and a double mode waveguide is formed in a direction perpendicular to the surface of the substrate 1.

Figure 2A:
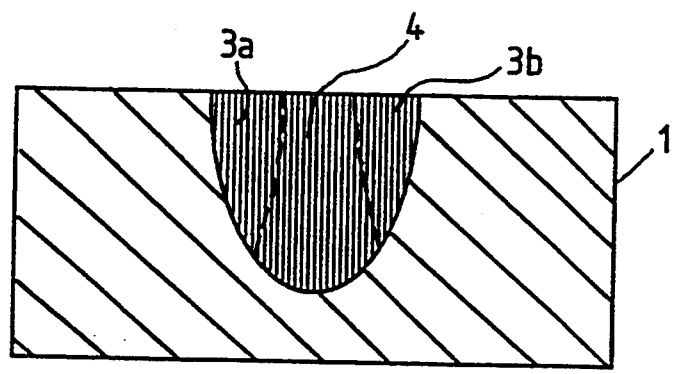
FIGS. 2A to 2C are sectional views for explaining a method of manufacturing the optical waveguide according to the first embodiment of the present invention.

A method of manufacturing the optical waveguide in FIGS. 1A and 1B will be described below with reference to FIGS. 2A to 2C. A resist is coated on the lithium niobate substrate 1 and patterned. A Ti film is deposited thereon by electron beam evaporation and the Ti film is patterned by the lift-off method. The substrate 1 having the Ti Film deposited is annealed at about 1,000° C. for a predetermined period of time to thermally diffuse Ti in the regions 4, 3a, and 3b in the substrate 1 (FIG. 2A).

A resist is coated on the substrate 1 and patterned. An MgO film is deposited on the substrate 1 by electron beam evaporation. The MgO film is patterned by the lift-off method to form the MgO films 413a and 413b on the regions 3a, 3b and outside the regions 3a and 3b (FIG. 2B). The substrate 1 having the MgO films 413a and 413b deposited is annealed at about 950° C. for a predetermined period of time to thermally diffuse Mg in the regions 3a, 3b, 3c, and 3d in the substrate 1 (FIG. 2C). The optical waveguide in this embodiment is thus completed.

The maximum mode number in the depth and width directions of the optical waveguide of this embodiment are determined by the width and depth of the core and the difference between the refractive index of the core and that of the clad. The shape of the region 4 serving as a core is determined by the thickness and shape of the Ti film, the Ti diffusion temperature and time, the arrangement of the MgO films 413a and 413b, the thicknesses and shapes of the MgO films 413a and 413b, and the Mg diffusion temperature and time. The refractive index of the core is the refractive index of the region 4 diffused with only Ti. The refractive index of the clad is the refractive index of the Ti- and Mg-diffused regions 3a and 3b and the refractive index of the nondiffused region 1a.

The optical waveguide which is a double mode waveguide in the depth direction and a single mode waveguide in the width direction can be manufactured by obtaining these parameters beforehand, calculating the normalized frequency Va in the depth direction of the core and the normalized frequency Vb in the width direction, and forming each region such that the following condition is satisfied.

$$V_1 < Va < V_2, V_0 < Vb < V_1$$

(where $V_0$, $V_1$ and $V_2$ are the normalized frequency during cutoff of 0th-, 1st- and 2nd-order modes respectively)

The parameters obtained by the present inventors is shown in Table 1.

TABLE 1

| | (1) Crystal orientation and diffusion coefficient of LiNbO$_3$ |
|---|---|
| (i) | When Ti is diffused at 1,000° C. |
| | X direction-0.2 μm$^2$/h |
| | Y direction-0.2 μm$^2$/h |
| | Z direction-0.2 μm$^2$/h |
| (ii) | When MgO is diffused at 950° C. |
| | Z direction-0.6 μm$^2$/h |
| (iii) | When Ti is diffused in MgO-doped LiNbO$_3$ (second embodiment) at 1,000° C. |
| | Z direction-0.2 μm$^2$/h |
| | X direction-0.03 μm$^2$/h |
| | (2) Change Δn in refractive index of LiNbO$_3$ (e: extraordinary light direction, o: ordinary light direction) |
| (i) | Ti-diffused region |
| | Δne, Δno-6 × 10$^{-3}$ |
| (ii) | MgO-diffused region |
| | Δne, Δno- |
| | (equal to Δn in |
| | Ti-diffusion or more) |
| | Sign is minus. |
| (iii) | Ti- and MgO-diffused region |
| | Overlap of Δn in Ti diffusion and |

TABLE 1-continued

| Δn in MgO diffusion as in FIG. 6 |
|---|

The waveguide manufactured by the conventional thermal diffusion has a structure in which a region serving as a core is formed in a substrate as in FIG. 2A. However, in order to manufacture a waveguide which is a double mode waveguide in the depth direction and a single mode waveguide in the width direction, it is necessary to diffuse sufficiently deep in the depth direction and sufficiently narrow in the width direction. In general, however, the diffusion coefficient of the lithium niobate crystal almost has the same value in the depth and width directions. For this reason, even when the Ti is narrowly patterned in the width direction, as far as Ti is diffused sufficiently deep to form a double mode waveguide in the depth direction, Ti is diffused wide in the width direction. Thus, a single mode waveguide in the width direction cannot be formed.

Figure 2B:
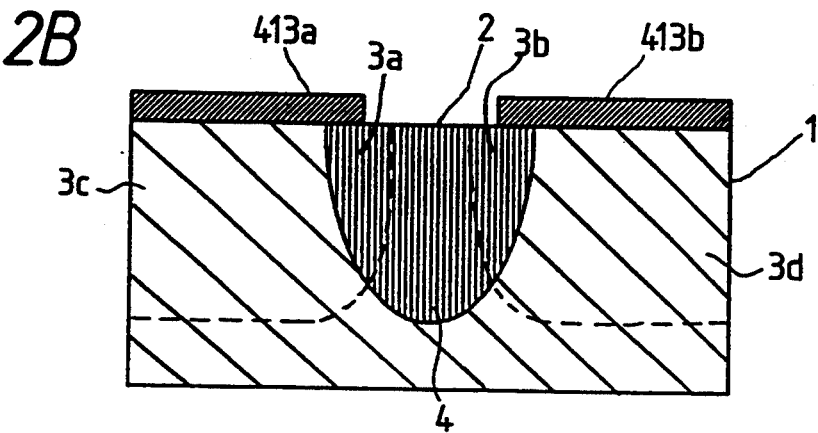
Figure 2C:
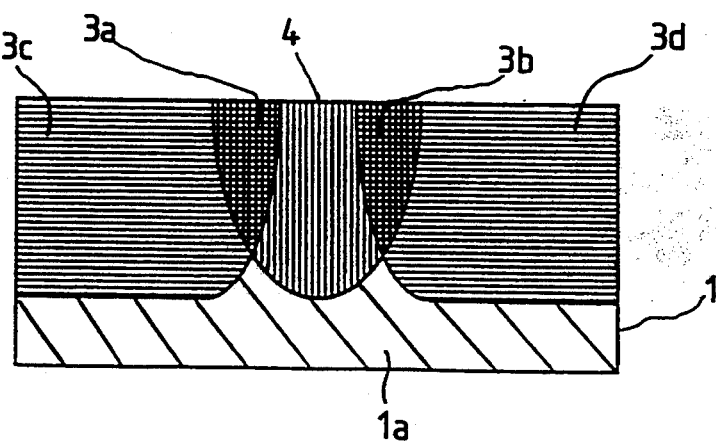

In this embodiment, as shown in FIG. 2B, Mg is additionally diffused in the regions 3a, 3b, 3c, and 3d to reduce the refractive index of the regions 3a and 3b. The regions 3a and 3b serve as a clad and the core 4 becomes narrower, thereby obtaining a single mode waveguide in the width direction.

As in this embodiment, when Mg for reducing the refractive index is additionally diffused in part of the region diffused with Ti for increasing the refractive index, a core having an arbitrary depth and width can be formed. In the optical waveguide of this embodiment, a core narrower than a conventional core can be formed. In this case, the normalized frequency Vb in the direction of width of the optical waveguide in this embodiment can realize the following condition if the normalized frequency in the direction of width in the optical waveguide structure in FIG. 2A using the regions 4, 3a, and 3b as a core is given as Vb'.

$$Vb < Vi < Vb'$$

(where Vi: cut off normalized frequency of ith-order mode) Therefore, an optical waveguide with a small maximum mode number which is impossible in the conventional structure as in FIG. 2A can be manufactured.

In this embodiment, the mode order in the direction of width is decreased by diffusing Mg on both sides of the Ti-diffused regions 4, 3a, and 3b in the direction of width. However, the mode order in the direction of depth can be decreased by diffusing Mg in the bottom or upper portion of the Ti-diffused regions 4, 3a, and 3b.

Second Embodiment

Figure 3A:
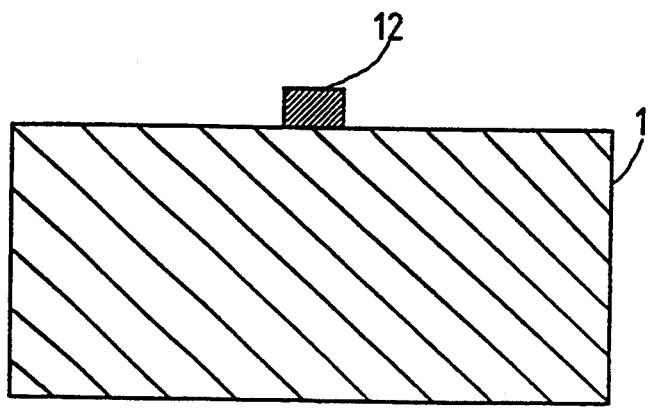
FIGS. 3A and 3B are sectional views for explaining a method of manufacturing an optical waveguide according to the second embodiment of the present invention.
Figure 3B:
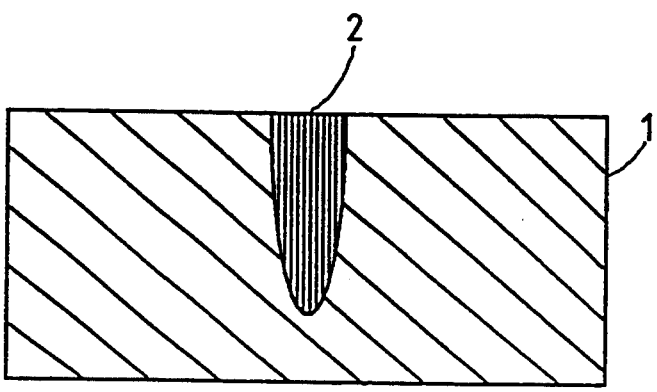

FIGS. 3A and 3B are schematic sectional views showing the structure of an optical waveguide according to the second embodiment of the present invention. It is reported that the Ti diffusion coefficient of the Mg-doped lithium niobate crystal differs by ten times or more depending on the orientation of the crystal (Bulmer, Electronics Letters, Vol. 20, No. 22, p. 902 (1984)). Such a lithium niobate crystal is used as a substrate, and its orientation is selected such that the diffusion coefficient in the width direction is sufficiently smaller than that in the depth direction. As in FIG. 3A, when a Ti film patterned to have a sufficiently small width (in the lateral direction) is formed, and only thermal diffusion is performed, a desired double mode core 2 in the depth direction can be obtained (FIG. 3B). At this time, the thermal diffusion conditions are set such that a double mode waveguide in the depth direction and a single mode waveguide in the width direction can be obtained.

Third Embodiment

Figure 4:
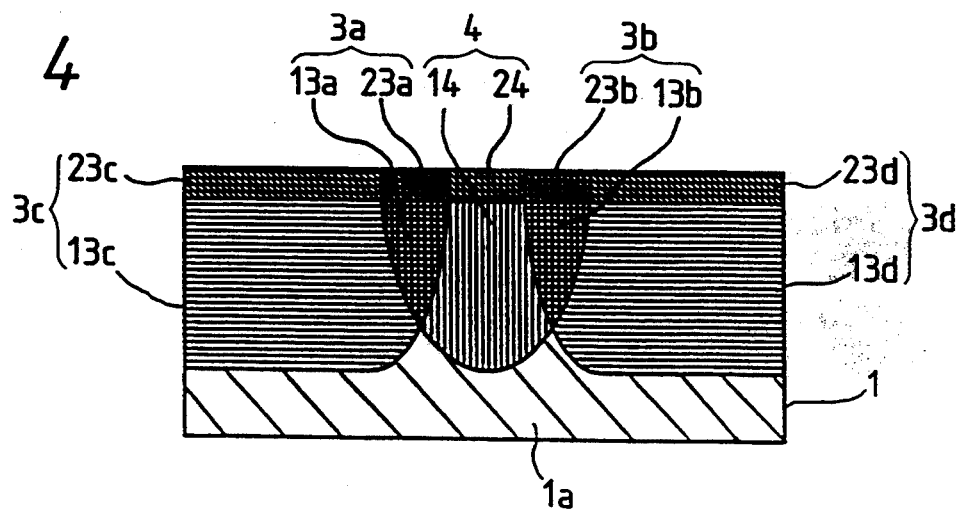
FIG. 4 is a sectional view showing the arrangement of an optical waveguide according to the third embodiment of the present invention.

The structure of an optical waveguide according to the third embodiment of the present invention will be described with reference to FIG. 4.

In the optical waveguide of this embodiment, Mg is additionally diffused in the surface of a substrate 1 of the optical waveguide in the first embodiment to form regions 24, 23a, 23b, 23c, and 23d. In this embodiment, a symmetrical mode distribution in the depth direction of the waveguide can be realized by this additional diffusion.

By this additional diffusion, a region 4 is divided into a region 14 diffused with only Ti and the Ti- and Mg-diffused region 24. A region 3a is divided into a region 13a diffused with Ti and Mg once respectively and the region 23a diffused with Ti once and Mg twice. Similarly, a region 3b is divided into a region 13b diffused Ti and Mg once respectively and the region 23b diffused with Ti once and Mg twice. A region 3c is divided into a region 13c diffused with Mg once and the region 23c diffused with Mg twice. A region 3d is divided into a region 13d diffused with Mg once and the region 23d diffused with Mg twice.

The regions 24, 23a, 23b, 23c, and 23d are diffused with Mg one more time than the regions 14, 13a, 13b, 13c, and 13d, and thus have refractive indices lower than those of the regions 14, 13a, 13b, 13c, and 13d.

Therefore, in this embodiment, the region 14 having the highest refractive index serves as a core. The regions 13a, 23a, 24, 23b, 13b, and 1a surrounding the region 14 serve as a clad.

Figure 5A:
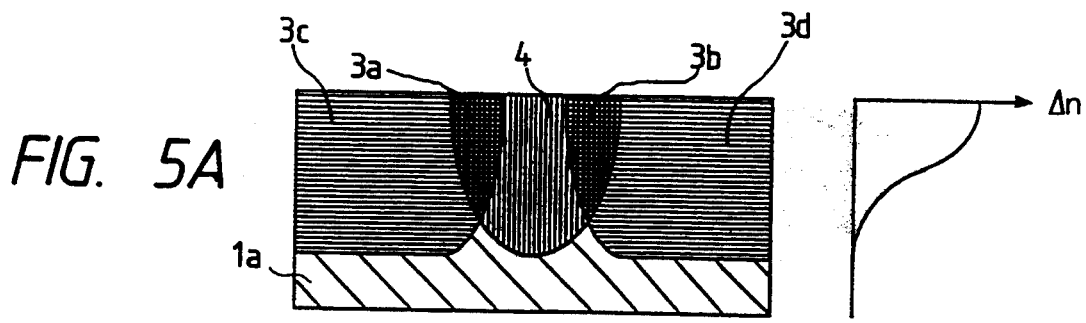
FIGS. 5A to 5C are sectional views for explaining a method of manufacturing the optical waveguide according to the third embodiment of the present invention with graphs showing a refractive index distribution.
Figure 5B:
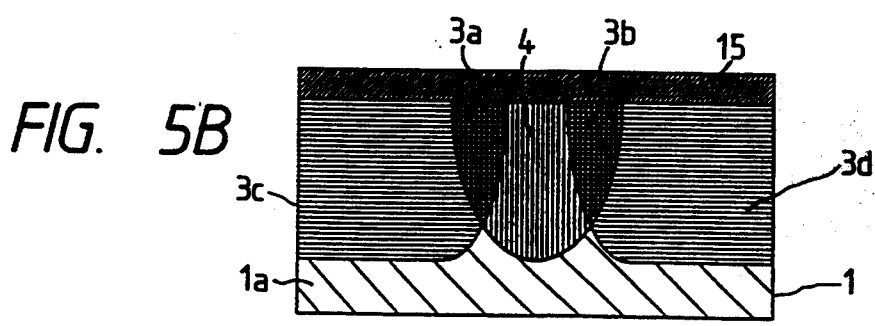
Figure 5C:
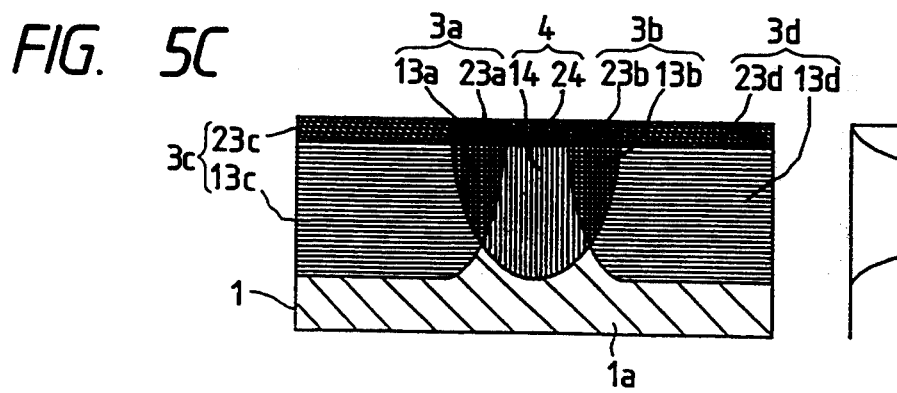

A method of manufacturing the optical waveguide in FIG. 4 will be described with reference to FIGS. 5A to C. First of all, the optical waveguide in FIG. 5A is manufactured in accordance with the manufacturing method of the first embodiment. The difference between the refractive index of the region 4 and that of the air layer is not equal to the difference between the refractive index of the region 4 and that of the region 1a. As shown in FIG. 5B, an MgO film 15 is formed on the substrate 1, and Mg is additionally diffused in the regions 24, 23a, 23b, 23c, and 23d, thereby completing the optical waveguide having the regions as in FIG. 5C.

The region 24 is diffused with both Ti and Mg and has a refractive index as shown in FIG. 6. The depth of diffusion of the region 24 is shallow so that the refractive index is close to that of a nondiffused substrate 1a, as shown in FIG. 6. For this reason, in the waveguide of this embodiment, the boundaries between the core and the clad in the depth direction are present between the region 24 (clad), the region 14 (core), and the region 1a (clad). The refractive index of the region 24 is almost equal to that of the region 1a, so that the mode distribution of the propagated light in the depth direction has a symmetrical shape. Therefore, an optical waveguide having a symmetrical mode distribution in both depth and width directions can be obtained. Since the region 14 serving as a core is buried in the substrate 1, a propagation loss caused due to roughness of the substrate surface can be reduced.

Although the optical waveguide in the first embodiment is used in the description of the third embodiment, the optical waveguide of the second embodiment manufactured by diffusing Mg in the substrate surface can provide the same effect.

Fourth Embodiment

Figure 7A:
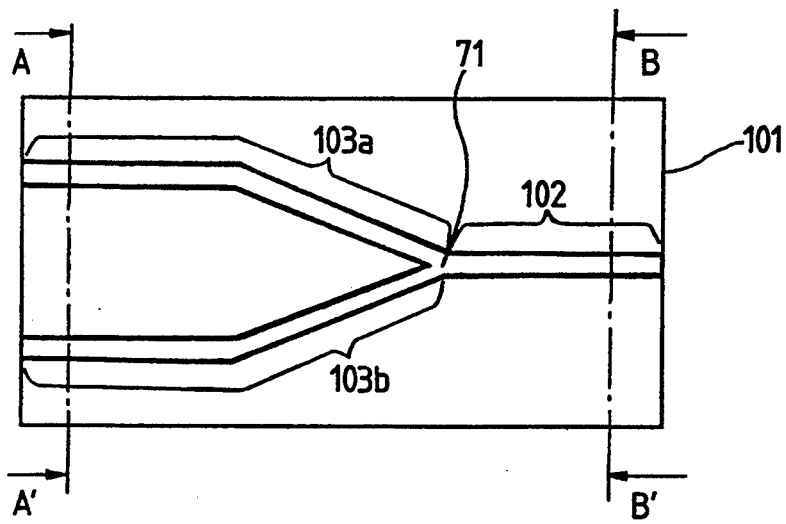
Figure 7B:
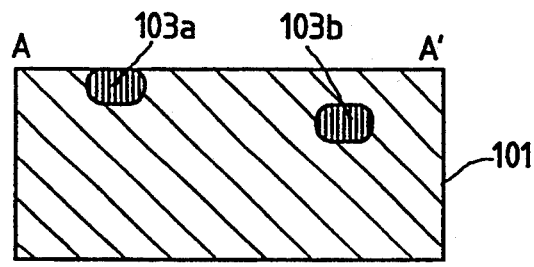
Figure 7C:
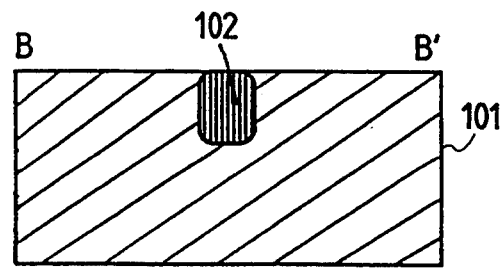

The structure of an optical waveguide according to the fourth embodiment of the present invention will be described below with reference to FIGS. 7A to 7C.

A core 102 formed in a substrate 101 and two branch cores 103a and 103b connected to the core 102 are formed in the optical waveguide of this embodiment. The substrate 101 is made of single-crystal lithium niobate. The cores 102, 103a, and 103b are formed by diffusing Ti or Mg in the substrate 101. The core 102 is a double mode waveguide in a direction (the depth direction) perpendicular to the surface of the substrate 101 and a single mode waveguide in a direction (the width direction) parallel to the surface of the substrate 101. The branch cores 103a and 103b are single mode waveguides in both depth and width directions. The branch cores 103a and 103b divide the core 102 in the depth direction. More specifically, of the light propagated in the core 102, the light propagated near the surface of the substrate 101 is directed to the waveguide 103a and the light propagated inside the substrate 101 is directed to the waveguide 103b, respectively. All of the cores 102, 103a, and 103b are single mode waveguides in the width direction.

A method of manufacturing the optical waveguide of this embodiment will be described with reference to FIGS. 8A, 8B, 8C, 9A, 9B, 10A and 10B.

Figure 8A:
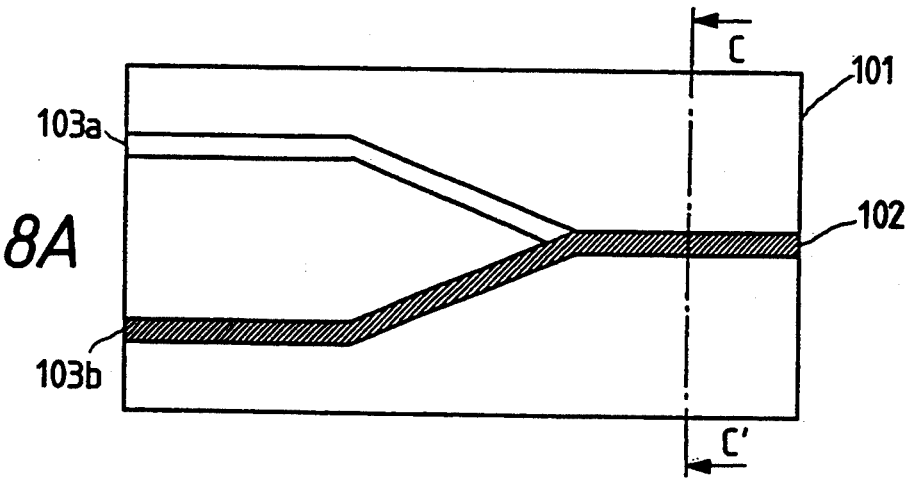
Figure 8B:
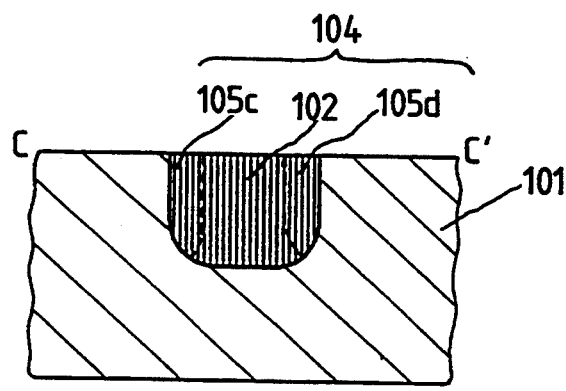
Figure 8C:
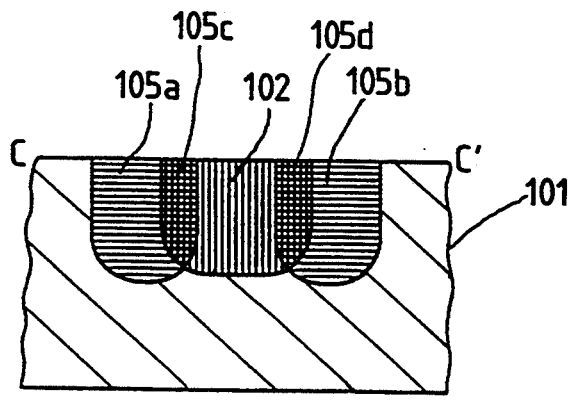
Figure 9A:
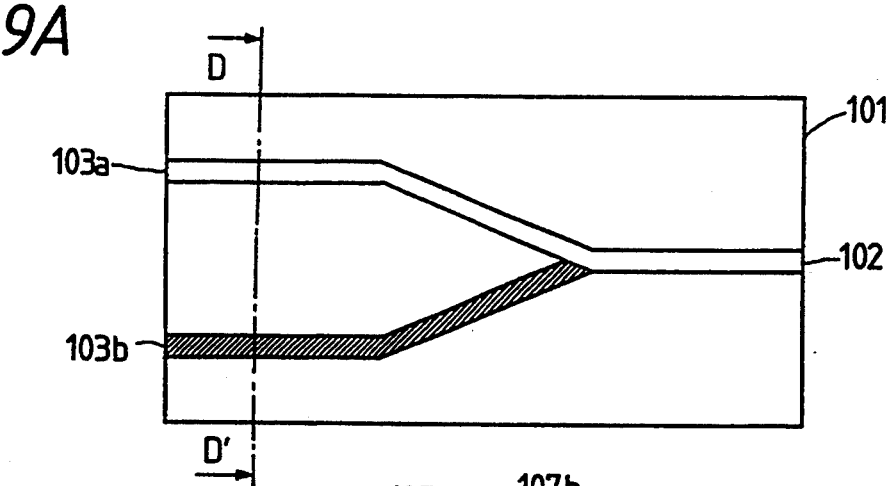
Figure 9B:
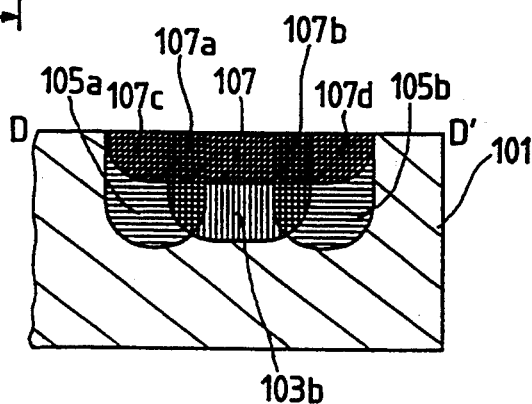

A pattern of a Ti film is formed in a hatched portion of the lithium niobate substrate 101 shown in FIG. 8A. Thermal diffusion is performed to form a region 104 having a high refractive index, as shown in FIG. 8B. The region 104 includes the core 102 and regions 105c and 105d on both the sides of the core 102.

In order to form the core 102 to be a double mode waveguide in the depth direction and a single mode waveguide in the width direction, it is necessary to diffuse Ti sufficiently deep in the depth direction and sufficiently narrow in the width direction. In general, however, the diffusion coefficient of the lithium niobate crystal has almost the same value in the depth and width directions. For this reason, even when Ti film is narrowly formed in the width direction, sufficiently deep diffusion of Ti to obtain a double mode waveguide in the depth direction results in wide diffusion of Ti in the regions 105c and 105d in the width direction. Therefore, a single mode waveguide in the width direction cannot be formed.

An MgO film is formed on the regions 105c and 105d on both the sides of the core 104, and thermal diffusion is performed (Mg is additionally diffused). Mg is diffused in the regions 105c and 105d and regions 105a and 105b. Since Mg reduces the refractive index of the lithium niobate crystal, the refractive index of the Mg-diffused regions is reduced to form a clad with respect to the core 102. When Mg is diffused in part of both the sides of the region 104, as in the regions 105c and 105d, this portion serves as a clad. As a result, the core 102 sufficiently deep in the depth direction and sufficiently narrow in the width direction can be formed. At this time, the conditions of MgO film patterning or additional diffusion are set such that the core 102 is formed to be a double mode waveguide in the depth direction and a single mode waveguide in the width direction.

At this time, a core which is a double mode waveguide in the depth direction and a single mode waveguide in the width direction like the core 102 is also formed in the branch core 103b.

Next, the branch core 103b is formed. An MgO film is formed in a hatched portion in FIG. 9A, and Mg is additionally diffused. More specifically, Mg is diffused in regions 107, 107a, 107b, 107c, and 107d near the surface of the substrate 101 to reduce the refractive index of these regions. Thus, the region 107 serving as a clad is formed in part of the core which is a double mode waveguide in the depth direction and a single mode waveguide in the width direction. As a result, the branch core 103b buried in the substrate 101 is formed. At this time, the Mg diffusion conditions are set such that the branch core 103b is to be a single mode waveguide in both the depth and width directions.

Figure 10A:
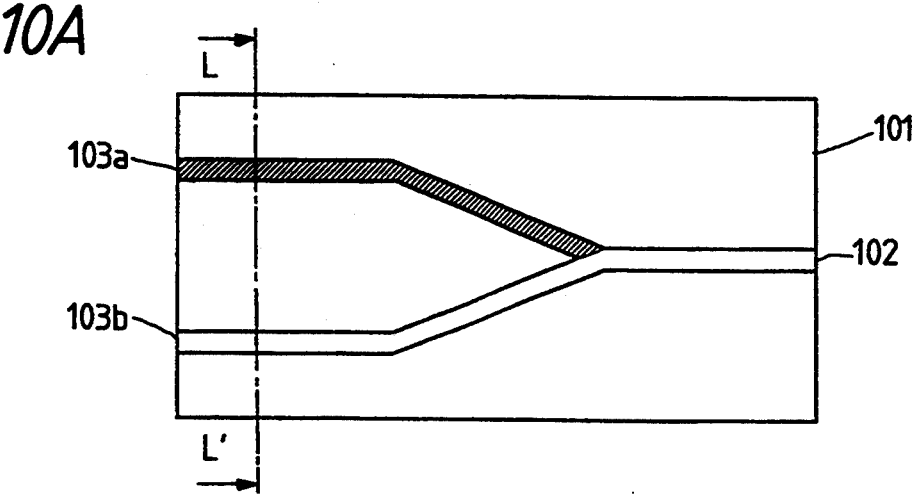
Figure 10B:
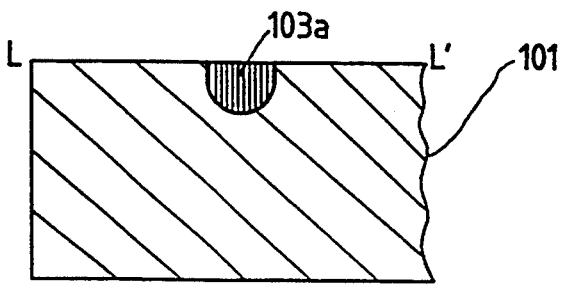

The branch core 103a is then formed. A Ti film is formed in a hatched portion in FIG. 10A, and thermal diffusion is performed to form the branch core 103a (FIG. 10B). At this time, the diffusion conditions are set such that the branch core 103a is to be a single mode waveguide in both the depth and width directions.

The diffusion conditions are set such that the core 102 is smoothly connected to the cores 103a and 103b at a portion where the core 102 is divided into the waveguides 103a and 103b.

Fifth Embodiment

The optical waveguide according to the fifth embodiment of the present invention will be described with reference to FIGS. 11A, 11B, 12A, 12B, 13A and 13B.

A core 112 formed in a substrate 111 and two branch cores 113a and 113b connected to the core 112 are arranged in the optical waveguide of this embodiment. The substrate 111 is made of single-crystal Mg-doped lithium niobate. The cores 112, 113a, and 113b are formed by diffusing Ti or Mg in the substrate 111. The core 112 is a double mode waveguide in a direction (the depth direction) perpendicular to the surface of the substrate 111 and a single mode waveguide in a direction (the width direction) parallel to the surface of the substrate 111. The branch core 113a and 113b are single mode waveguides in both the depth and width directions.

It is reported that the Ti diffusion coefficient of the Mg-doped lithium niobate crystal differs by ten times or more depending on the crystal orientation (Bulmer, Electronics Letters, Vol. 20, No. 22, p. 902 (1984)). Such Mg-doped lithium niobate crystal is used as the substrate 111, and the crystal orientation is selected such that the diffusion coefficient in the width direction is sufficiently smaller than that in the depth direction. When the Ti film patterned sufficiently narrow in the width direction is formed in a hatched portion in FIG. 11A, and only thermal diffusion is performed, the desired core 112 which is a double mode waveguide in the depth direction and a single mode waveguide in the width direction can be obtained (FIG. 11B). At this time, the thermal diffusion conditions are set such that a double mode waveguide in the depth direction and a single mode waveguide in the width direction are formed.

In this case, a core which is a double mode waveguide in the depth direction and a single mode waveguide in the width direction are also formed in the branch core 113b. An MgO film pattern is formed in a hatched portion in FIG. 12A, and additional diffusion is performed. When an Mg-diffused region 121 is formed in part of the core which is a double mode waveguide in the depth direction and a single mode waveguide in the width direction, the refractive index of the region 121 is reduced and the region 121 serves as a clad, as shown in FIG. 12B. The core 113b buried in the substrate 111 is thus formed. The Mg diffusion conditions are set such that the core 113b is to be a single mode waveguide in both the depth and width directions.

Figure 13A:
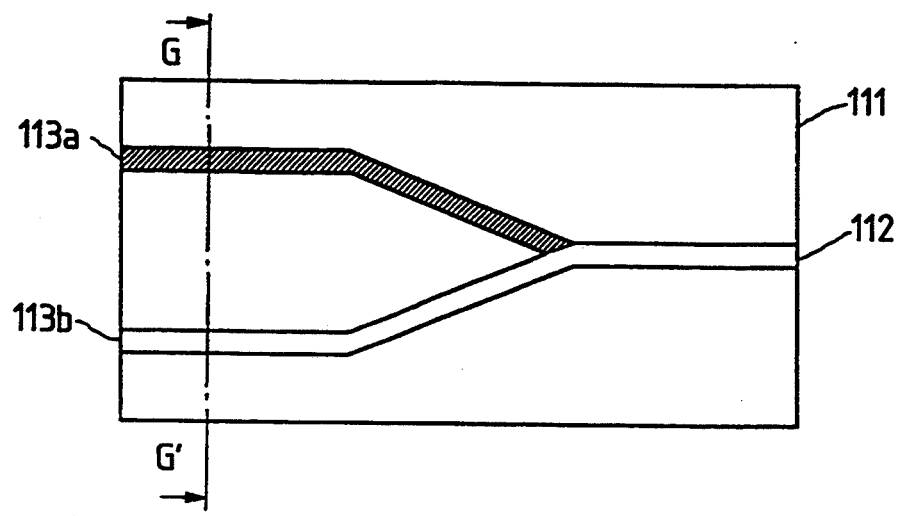
Figure 13B:
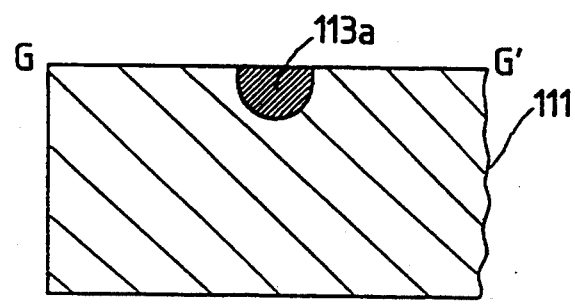

The branch core 113a is then formed. A Ti film pattern is formed in a hatched portion in FIG. 13A, and thermal diffusion is performed to form the core 113a (FIG. 13B). The diffusion conditions are set such that the core 113a is to be a single mode waveguide in both the depth and width directions.

In addition, the diffusion conditions are set such that the core 112 is smoothly connected to the cores 113a and 113b at a branch portion 72 where the waveguide 112 is divided into the waveguides 113a and 113b.

Sixth Embodiment

The structure of an optical waveguide according to the sixth embodiment of the present invention will be described with reference to FIGS. 14A to 14D. In the fourth or fifth embodiment, asymmetrical boundaries are present between air, the core, and the lithium niobate substrate in the depth direction of the double mode waveguide 102 or 112 and the branch core 103a or 113a. For this reason, the refractive index distribution in the depth direction of the waveguide is also asymmetrical, and the mode distribution in the depth direction of the propagated light is also asymmetrical. In this embodiment, an Mg-diffused region is further formed in the substrate surface to provide a waveguide having a symmetrical mode distribution in the depth direction.

Figure 14A:
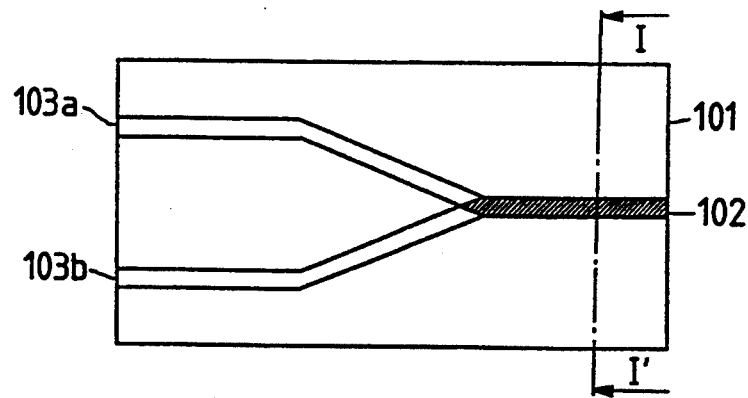
Figure 14B:
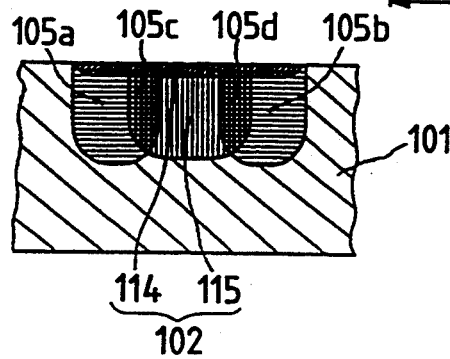

Referring to FIGS. 14A to 14D, waveguides 102, 103a, and 103b are the waveguides manufactured in the fourth embodiment. In this embodiment, an MgO film is patterned in a hatched portion in FIG. 14A, and Mg is additionally diffused. As shown in FIG. 14B, the refractive index of an Mg-diffused region 114 in the substrate surface is reduced to form a clad, and a core 115 buried in a substrate 101 is formed.

Figure 14C:
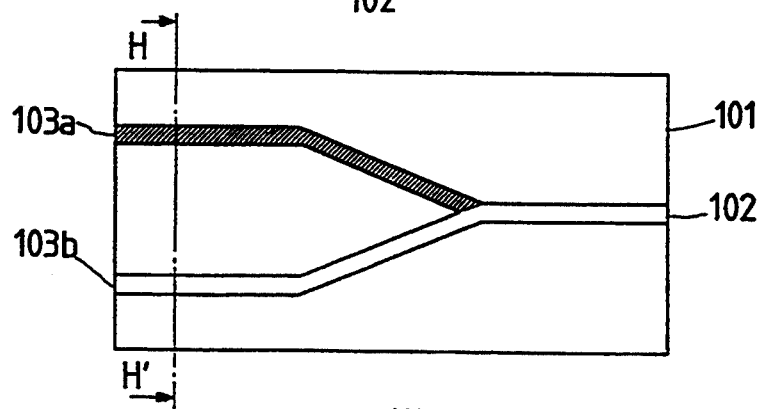
Figure 14D:
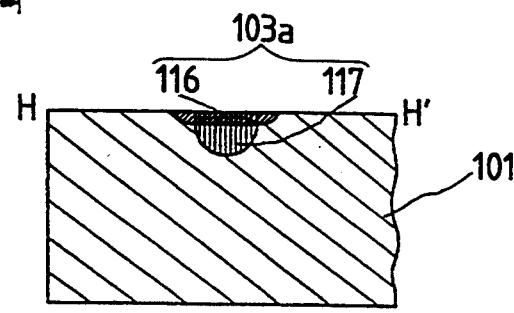

An MgO film is then patterned in a hatched portion in FIG. 14C, and Mg is additionally diffused. As shown in FIG. 14D, an Mg-diffused region 116 in the substrate surface serves as a clad, and a core 117 buried in the substrate 101 is formed. When the refractive index of the substrate surface is reduced in appropriate additional Mg diffusion conditions, a symmetrical refractive index distribution in the depth direction can be obtained and the cores 115 and 117 having a symmetrical mode distribution can be formed.

In this embodiment, since the core is buried, a propagation loss caused due to roughness of the surface of the substrate 101 can also be reduced.

Although the optical waveguide in the fourth embodiment is used in the description of the sixth embodiment, the waveguide in the fifth embodiment can also be used.

In the first to sixth embodiments described above, conditions for the diffusion process must be selected such that the previous diffusion is not influenced.

Seventh Embodiment

An embodiment of an apparatus in which a double mode optical waveguide of the present invention is used will be described below.

When a laser beam is incident in the double mode waveguide, the 0th-order mode and the 1st-order mode are excited in the waveguide in correspondence with the amplitude distribution of the incident light. These two modes interfere with each other in the waveguide, and as a result, asymmetry is caused in the entire light intensity distribution. There are two factors for causing asymmetry in the light intensity distribution in the waveguide. One is the asymmetrical intensity distribution of the incident laser light, and the other is the asymmetrical phase distribution of the incident laser light. When the length of the double mode region is appropriately selected, asymmetry can be effectively detected in both the cases (H. Ooki and J. Iwasaki, Optics Communications 85 (1991) 177).

Figure 15:
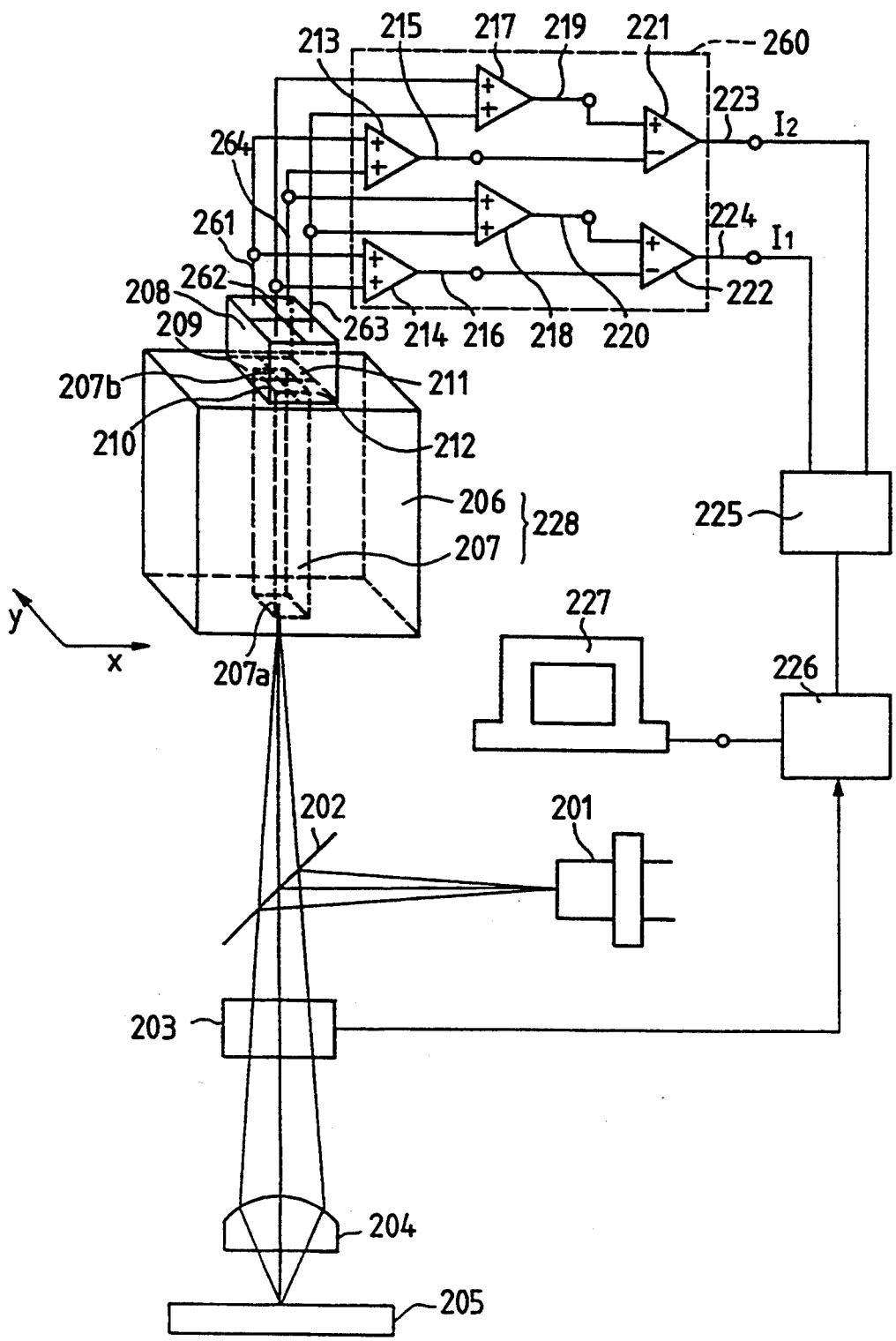
FIG. 15 is a block diagram showing the arrangement of a confocal laser scanning differential interference microscope according to the seventh embodiment of the present invention.

The embodiment in which the waveguide according to the present invention is used in a confocal laser scanning differential interference microscope is shown in FIG. 15.

A waveguide 228 is a double mode waveguide in the depth and width directions. The waveguide 228 has the same structure as in the waveguide of the third embodiment shown in FIG. 4. However, in the waveguide of this embodiment, the region 14 is widened and the regions 3a and 3b are arranged to obtain a double mode waveguide in the width direction. Referring to FIG. 15, a core 207 corresponds to the region 14 in FIG. 4. A clad 206 corresponds to the regions 3a, 3b, 24, 13c, 13d, and 1a in FIG. 4.

The confocal laser scanning differential interference microscope in this embodiment comprises an illuminating optical system constituted by sequentially arranging, on the optical axis, a semiconductor laser light source 201, a half mirror 202 for deflecting the light beam emitted from the semiconductor laser light source 201, and an objective lens 204 for focusing the light beam on a target object 205, as shown in FIG. 15. A known X-Y two-dimensional scanner 203 for scanning on the target object 205 with the light beam is arranged between the half mirror 202 and the objective lens 204. The confocal laser scanning differential interference microscope in this embodiment further comprises a three-dimensional channel waveguide 228 and a photodetector 208 having a silicon photodiode with a four-divided light-receiving surface. The objective lens 204 also serves as a focusing optical system for focusing the light reflected by the target object 205. The three-dimensional channel waveguide 228 and the photodetector 208 form an optical system for detecting the light reflected by the target object 205. The light-receiving surface of the detector 208 is constituted by four square light-receiving surfaces 209, 210, 211, and 212 having the same area, as shown in FIG. 15. The four light-receiving surfaces 209, 210, 211, and 212 are arranged along the X- and Y-axes in the checker-like layout. The center of the light-receiving surface of the detector 208 corresponds to the center of an output port 207b of the three-dimensional channel waveguide and is joined with the output port 207b.

Signal lines 261, 262, 263, and 264 for outputting the detected light power as an electric signal to a signal processing circuit 260, and a ground line 265 are connected to the light-receiving surfaces 209, 210, 211, and 212 of the detector 208. The signal processing circuit 260 for processing these signals has a sum detector 213 for adding output signals from the light-receiving surfaces 209 and 211 adjacent to each other along the X-axis, and a sum detector 217 for adding output signals from the light-receiving surfaces 210 and 212 adjacent to each other along the X-axis. The signal processing circuit 260 also has a sum detector 214 for adding output signals from the light-receiving surfaces 209 and 210 adjacent to each other along the Y-axis, and a sum detector 218 for adding output signals from the light-receiving surfaces 211 and 212 adjacent to each other along the Y-axis. A differential detector 221 detects a differential signal $I_2$ between output signals from the sum detectors 213 and 217 to obtain a difference of the light power in the Y direction. A differential detector 222 detects a differential signal $I_1$ between output signals from the sum detectors 214 and 218 to obtain a difference of the light power in the X direction. A signal synthesizing circuit 225 uses the differential signal $I_1$ in the X direction, the differential signal $I_2$ in the Y direction, and an angle $\phi$ designated by the user to indicate the differential image of the target object in the desired direction to synthesize a differential signal $I(\phi)$ in the $\phi$ direction in accordance with the following equation.

$$I(\phi) = I_1 \sin\phi + I_2 \cos\phi$$

A controller 226 receives a signal indicating the position of the light beam on the target object from the X-Y two-dimensional scanner 203 and stores the position signal as image data in correspondence with the differential signal $I(\phi)$. A monitor 227 receives the image data from the controller and displays the image.

Referring to FIG. 15, the waveguide 228 is constituted to propagate only $E_{00}$, $E_{10}$, and $E_{01}$ modes and not to propagate an $E_{11}$ mode when the mode number in the x direction (direction of width) is represented by p, the mode number in the y direction (direction of depth) is represented by q, and the propagation mode is represented by $E_{pq}$.

In a confocal laser scanning differential interference microscope for observing the phase distribution of an object, a length L from an input port 207a to the output port 207b of the core 207 of the waveguide 228 satisfies the following equations:

$$L \approx L_{c1}(2m+1)/2, \text{ and } L \approx L_{c2}(2n+1)/2$$

$$(m=1, 2,), (n=1, 2,)$$

where $L_{c1}$ is the coupling length of the $E_{00}$–$E_{10}$ mode, and $L_{c2}$ is a coupling length of the $E_{00}$–$E_{01}$ mode.

In a confocal laser scanning differential interference microscope for observing the intensity distribution of an object, the length L is defined by the following equations:

$$L \approx mL_{c1}, \text{ and } L \approx nL_{c2}$$

$$(m=1, 2,), (n=1, 2,)$$

Referring to FIG. 15, the light beam from the semiconductor laser light source 201 is reflected by the half mirror 202, incident on the objective lens 204 via the known X-Y two-dimensional scanner 203, and focused on the target object 205. The light reflected by the surface of the target object 205 passes through the half mirror again via the objective lens 204 and the X-Y two-dimensional scanner 203, and is focused on the input port 207a of the core 207 of the waveguide 228. The waveguide 228 is a double mode waveguide in the direction of width (x direction) and in the direction of depth (y direction). The light propagated in the core 207 of the waveguide 228 emerges from the output port 207b and reaches the photodetector 208 having a four-divided light-receiving surface joined with the core 207. The photodetector 208 is joined such that the center of the four-divided light-receiving surface corresponds to the center of the waveguide 228. The input port 207a of the waveguide 228 has the same function as a pinhole, thereby constituting a confocal laser scanning microscope.

Figure 16A:
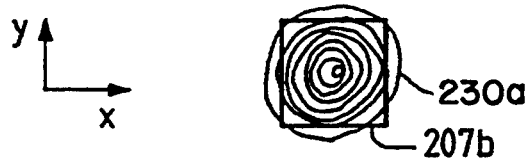
FIGS. 16A to 16D are explanatory views showing the pattern of propagated light at an exit port 207b of a waveguide 228 of the confocal laser scanning differential interference microscope according to the seventh embodiment of the present invention.
Figure 16B:
Figure 16C:
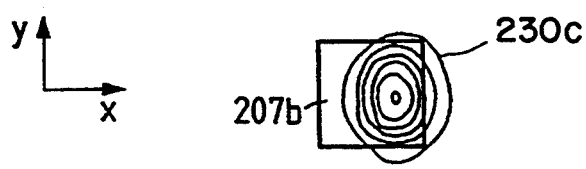

When an inclination or a reflectance gradient in the direction of width (x direction) of the waveguide is present at one point on the target object 205 irradiated with a laser beam spot, both $E_{00}$ and $E_{10}$ modes are excited in the core 207 of the waveguide 228. The pattern of the propagated light 230c at the output port 207b at this time is shown in FIG. 16C. Referring to FIGS. 16A to 16D, a plurality of concentric lines in each pattern of the propagated light 230a–230d are iso-intensity lines showing the intensity distribution of the pattern of the propagated light. The pattern of the propagated light as shown in FIGS. 16A to 16D has the highest intensity at the central portion and is lowered toward the periphery. When both $E_{00}$ and $E_{10}$ modes are excited, the pattern of the propagated light 230c shown in FIG. 16C is formed by interference of the two modes, so that the intensity of a sum signal 216 obtained by the sum detector 214 for adding the outputs from the light-receiving surfaces 209 and 210 of the photodetector 208 is not equal to the intensity of a sum signal 220 obtained by the sum detector 218 for adding the outputs from the light-receiving surfaces 211 and 212. Therefore, when a differential signal between the sum signal 216 of the light-receiving surfaces 209 and 210 and the sum signal 220 of the light-receiving surfaces 211 and 212 of the photodetector 208 is obtained by the differential detector 222, a very small step or change in reflectance in the direction of width (x direction) of the waveguide on the object can be detected. At this time, no signal is detected from the differential detector 221.

When an inclination or a reflectance gradient in the direction of depth (y direction) of the waveguide is present at one point on the surface of the target object 205 irradiated with a laser beam spot, both $E_{00}$ and $E_{01}$ modes are excited in the core 207 of the double mode waveguide 228. The pattern of the propagated light 230b at this time is shown in FIG. 16B. Because of interference between the two modes, the intensity of the signal 215 obtained from the sum detector 213 for adding the outputs from the light-receiving surfaces 209 and 211 of the photodetector 208 is not equal to the intensity of the signal 219 obtained from the sum detector 217 for adding the outputs from the light-receiving surfaces 210 and 212. Therefore, when the differential signal 223 between the sum signal 215 from the light-receiving surface 209 and 211 and the sum signal 219 from the light-receiving surfaces 210 and 212 of the photodetector 208 is obtained, a very small step or a change in reflectance in the direction of depth (y direction) of the waveguide on the object can be detected. At this time, no signal is detected from the differential detector 222.

When no inclination or reflectance gradient is present on the surface of the target object 205 irradiated with a laser beam spot, only $E_{00}$ mode is excited. The pattern of the propagated light 230a at this time is shown in FIG. 16A. The intensity of the signal 215 obtained from the sum detector 213, the intensity of the signal 219 obtained from the sum detector 217, the intensity of the signal 216 obtained from the sum detector 214, and the intensity of the signal 220 obtained from the sum detector 218 are equal to each other, so that it is detected that no inclination or reflectance gradient is present.

Figure 16D:
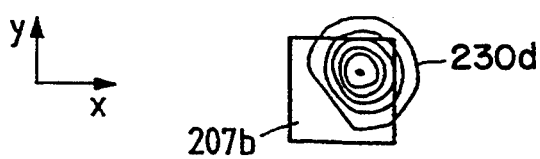
Figure 17A:
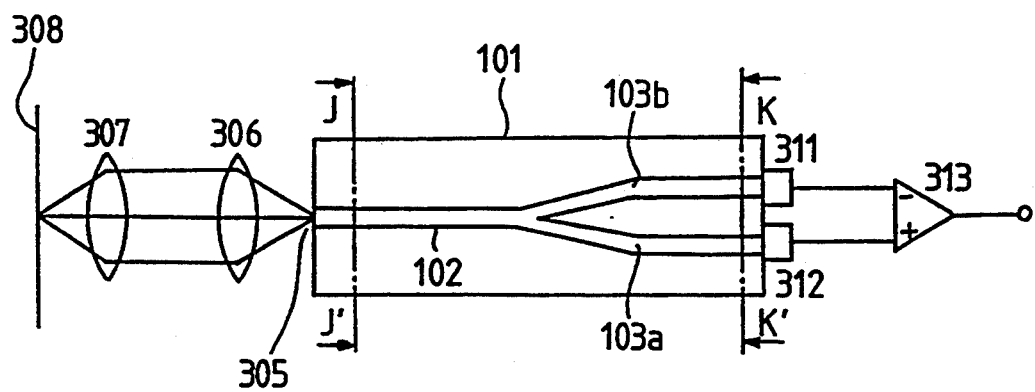
Figure 17B:
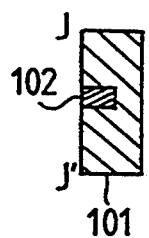
Figure 17C:
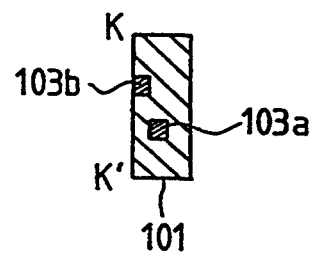
Figure 17D:
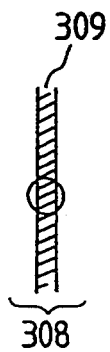

When inclinations or reflectance gradients are present in both the x and y directions on the surface of the target object 205 irradiated with a laser beam spot, $E_{00}$, $E_{10}$, and $E_{01}$ modes are excited. The pattern of the propagated light 230d at this time is shown in FIG. 16D. At this time, because of the interference between the modes, the light intensities on the light-receiving surfaces 209, 210, 211, and 212 are different from each other. Therefore, the differential signals 223 and 224 are output from the differential detectors 221 and 222, and the inclinations or reflectance gradients in the x and y directions are detected.

When the differential signals 224 and 223 are $I_1$ and $I_2$, respectively, the signal synthesizing circuit performs the following process:

$$I(\phi) = I_1 \sin\phi + I_2 \cos\phi$$

where $\phi$ is set to an appropriate value within the range of 0 to $\pi$ designated by the user. The controller 226 stores the obtained signal in correspondence with the position of the light beam on the target object 205 from the X-Y two-dimensional scanner 203 and displays a differential interference image having a contrast in the desired direction on a monitor 227.

As described above, in the confocal scanning differential interference microscope in this embodiment, the double mode waveguide 228 in the depth and width directions is used, so that a differential interference image in the desired direction on the X-Y plane of the target object 205 can be obtained by a simple structure as in FIG. 15. In addition, since the double mode waveguide 228 can be easily formed at a high precision by using the thermal diffusion method as described in the third embodiment, it can be manufactured at a low cost. The confocal scanning differential interference microscope has a small number of components as shown in FIG. 15, and the double mode waveguide 228 can be manufactured at a low cost and a high precision. Therefore, a confocal scanning differential interference microscope for obtaining a differential interference image in the two-dimensional direction can be manufactured at a low cost and a high precision.

Eighth Embodiment

An embodiment in which the waveguide according to the present invention is used in the tracking error detector of an optical head used for an optical disk or the like is shown in FIGS. 17A to 17D. In general, the tracking error signal in an optical disk is generated by diffraction of an guide groove formed in the disk surface. A method of extracting a change in intensity of a diffraction pattern by a two-divided detector is called as a push-pull method and widely used. The reflected light from the disk includes information of the guide groove as a phase signal. When tracking is shifted, asymmetry is caused in the phase distribution of the reflected light. Thus, in this embodiment, the mode interference of the double mode waveguide of the present invention is used to detect this asymmetry, thereby obtaining a tracking error signal.

Referring to FIGS. 17A to 17D, a light beam from the laser light source (not shown for the sake of simplicity) is reflected by a disk 308 and incident on an incident end face 305 of a core 102 of the optical waveguide of this embodiment shown in FIGS. 17A to 17D via an objective lens 307 and a collimator lens 306. This laser beam spot has information from a guide groove 309 of the optical disk 308. When this phase information has asymmetry, the 0th- and 1st-order modes are excited in the direction of depth of the double mode core 102. In order to efficiently extract the phase information, the length of the double mode core 102 is preferably a ½ integer multiple of the coupling length of the 0th- and 1st-order modes. However, the length of the core 102 also depends on the depth of the groove 309 of the optical disk 308. The power of the light exited from branch cores 103a and 103b is detected by photoelectric detectors 311 and 312, and a difference is obtained from a differential amplifier 313, thereby obtaining a tracking error amount on the surface of the disk 308. The read system for a signal recorded on the disk 308 or an optical system for autofocusing is omitted.

Since the tracking error detector of the optical head in this embodiment uses a double mode waveguide to decrease the number of optical components, as shown in FIGS. 17A to 17D, the number of optical systems which require precise positioning is decreased to make it easy to assemble the optical components.

As described above, according to the first to sixth embodiments of the present invention, an optical waveguide having a depth/width mode ratio which cannot be obtained in the conventional waveguide can be provided. For example, an optical waveguide which is a double mode waveguide in the depth direction and a single mode waveguide in the width direction can be manufactured. The optical waveguide exemplified in these embodiments can be easily manufactured by using the thermal diffusion method to reduce the manufacturing cost. In addition, as shown in the third and sixth embodiments, a waveguide having a symmetrical mode distribution in the depth direction can be manufactured. In these embodiments, a waveguide having arbitrary mode number in the depth and width directions can be manufactured, so that the waveguides can be widely applied in various fields. As in the seventh and eighth embodiments, the optical waveguide of the present invention can be used to improve resolution of the apparatus to provide a low-cost apparatus.

The fifth and sixth embodiments, the waveguides 102 and 112 are double mode waveguides in the depth direction and single mode waveguides in the width direction and their branch core 103a, 103b, 113a, and 113b are single mode waveguides in both the depth and width directions. However, the present invention is not limited to this. A structure in which the waveguides 102 and 112 are double mode waveguides in both the depth and width directions and the branch cores 103a, 103b, 113a, and 113b are single mode waveguides in the depth direction and double mode waveguides in the width direction can also be manufactured by using the method shown in those embodiments.

In the above embodiments, Ti is used as a diffusion source when a core is formed by the diffusion method. However, a transition metal such as V, Ni, Cu, or the like may be used as a diffusion source in place of Ti when a lithium niobate substrate is used.

In the first-to fourth embodiments, the method of manufacturing a waveguide which is a double mode waveguide in the depth direction and a single mode waveguide in the width direction has been described. However, a double mode waveguide in both the depth and width directions can also be manufactured by this method.

In the seventh and eighth embodiments, the lithium niobate substrate has an electrooptical effect. For this reason, when an electrode is formed on the substrate and an electric field is applied to the waveguide, the coupling length of the 0th- and 1st-order mode light propagated in the double mode waveguide can be changed. When an electrode is arranged as described above, the conditions for the waveguide length shown in the seventh and eight embodiments can be satisfied by changing the coupling length. Therefore, the allowable range of errors of the waveguide length can be widely set when the waveguide is to be manufactured. In the confocal laser scanning microscope of the seventh embodiment, both phase and intensity distributions of the target object can be observed by a single waveguide.

In the confocal laser scanning microscope of the seventh embodiment, when the objective lens 204 is replaced with a lens for converting illumination light into parallel light, an inclination detector for detecting the inclination of the target object 205 can be constituted.

As described above, according to the present invention, a region diffused with an element for reducing the refractive index of the substrate is arranged to overlap a region diffused with an element for increasing the refractive index of the substrate, thereby easily controlling the mode numbers in the depth and width directions to manufacture an optical waveguide having arbitrary mode numbers.

What is claimed is:

1. An optical waveguide comprising:
   a substrate;
   a first region formed in said substrate by diffusing a first diffusion material containing at least one element; and
   a second region formed in said substrate by diffusing a second diffusion material containing at least one element different from that of the first diffusion material,
   wherein at least part of said second region overlaps part of said first region,
   a region of said first region which does not overlap said second region has a refractive index higher than that of a region where said first region overlaps said second region and that of said substrate, and
   the region of said first region which does not overlap said second region serves as a core which propagates light, and a region where said first region overlaps said second region and a region of said substrate not diffused with the first and second diffusion materials serve as a clad.

2. A waveguide according to claim 1, wherein said first and second regions are arranged such that a normalized frequency V determined by a width of the core and refractive indices of the core and clad satisfies the following condition:

$$V < V_i < V'$$

where $V_i$: a cut off normalized frequency of an ith-order mode,
   i : a predetermined specific natural number,
   V': a normalized frequency for a waveguide in which, in said substrate having only said first region and no second region, said first region serves as a core and a region of said substrate not diffused with the first diffusion material serves as a clad.

3. A waveguide according to claim 2, wherein the core constituted by the region of said first region which does not overlap said second region has, as a maximum mode number in a direction parallel to a surface of said substrate, a mode number not more than a maximum mode number in a direction perpendicular to the surface of said substrate.

4. A waveguide according to claim 3, wherein the core is a single mode core in the direction parallel to the surface of said substrate and a double mode core in the direction perpendicular to the surface of said substrate.

5. A waveguide according to claim 4, wherein branch waveguide for dividing the light propagated in the core in the direction perpendicular to the surface of said substrate are formed in said substrate.

6. A waveguide according to claim 5, wherein the branch waveguide has two branch cores connected to said core, and the two branch cores are respectively formed in part of said substrate by diffusing a third diffusion material containing at least one element, and one of the two branch cores is formed at a deeper position from the surface of said substrate than the other.

7. A waveguide according to claim 6, wherein at least two elements are diffused in a region between the surface of said substrate and the branch core formed at the deeper position from the surface of said substrate.

8. A waveguide according to claim 7, wherein said substrate is made of a lithium niobate crystal, the third material contains at least Ti, and at least Ti and Mg are diffused in the region between the surface of said substrate and the branch core formed at the deeper position from the surface of said substrate.

9. A waveguide according to claim 3, wherein the core is a double mode core in the directions parallel and perpendicular to the surface of said substrate.

10. A waveguide according to claim 1 wherein said second region is arranged on each side of said first region along a direction of light propagation.

11. A waveguide according to claim 1, wherein at least one element contained in the first diffusion material and at least one element contained in the second diffusion material are metal elements.

12. A waveguide according to claim 11, wherein said substrate is made of a lithium niobate crystal, the first diffusion material contains at least Ti, and the second diffusion material contains at least

* * * * *